No. 758,702. PATENTED MAY 3, 1904.
C. F. SCOTT.
SYSTEM OF ALTERNATING CURRENT DISTRIBUTION.
APPLICATION FILED SEPT. 13, 1902.
NO MODEL.
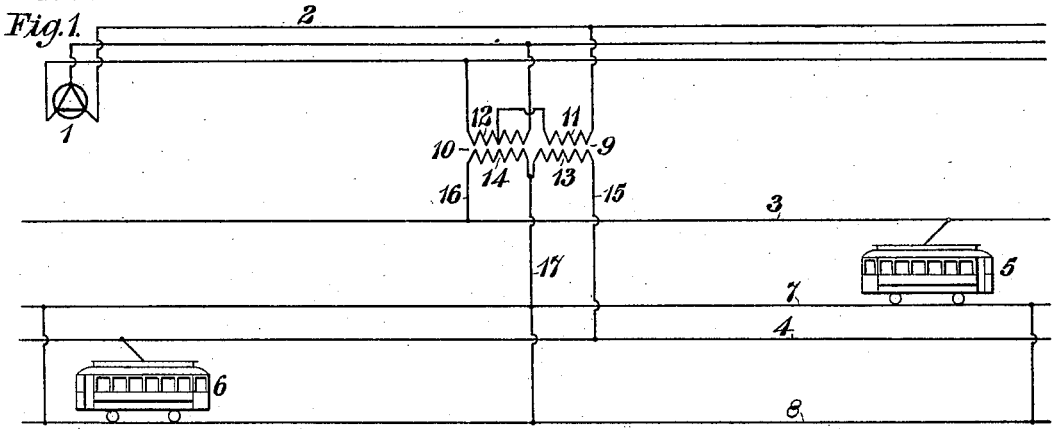
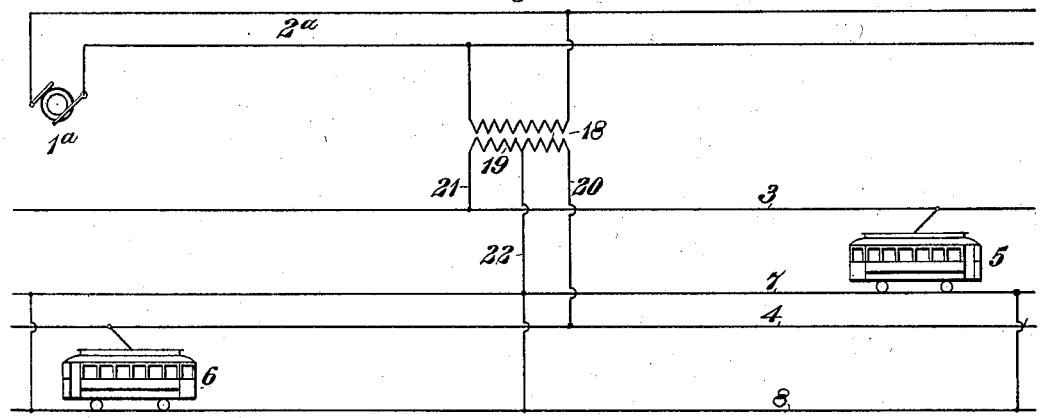
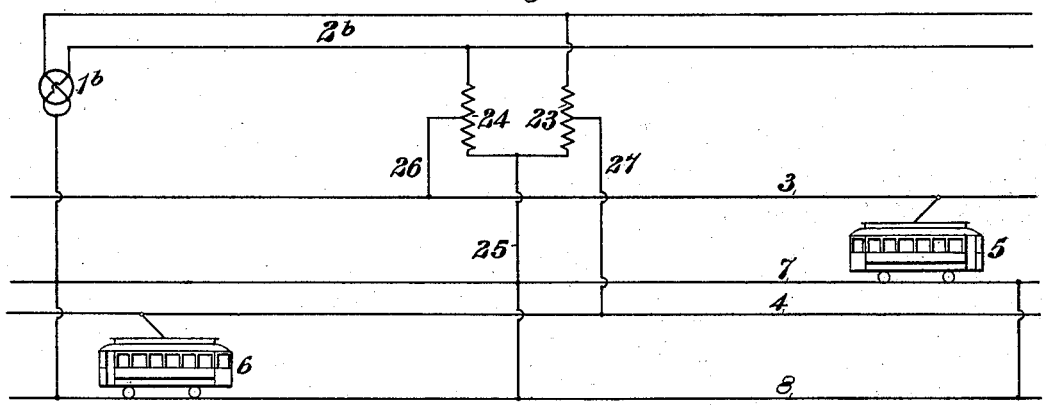
WITNESSES:
C. L. Belcher
J. C. Morse
INVENTOR
Charles F. Scott
BY
Wesley G. Carr
ATTORNEY No. 758,702.

Patented May 3, 1904.

UNITED STATES PATENT OFFICE.

CHARLES F. SCOTT, OF PITTSBURG, PENNSYLVANIA, ASSIGNOR TO WESTINGHOUSE ELECTRIC & MANUFACTURING COMPANY, A CORPORATION OF PENNSYLVANIA.

SYSTEM OF ALTERNATING-CURRENT DISTRIBUTION.

SPECIFICATION forming part of Letters Patent No. 758,702, dated May 3, 1904.

Application filed September 13, 1902. Serial No. 123,343. (No model.)

*To all whom it may concern:*

Be it known that I, CHARLES F. SCOTT, a citizen of the United States, residing at Pittsburg, in the county of Allegheny and State of Pennsylvania, have invented a new and useful Improvement in Systems of Alternating-Current Distribution, of which the following is a specification.

My invention relates to systems of alternating-current distribution, and particularly to such systems as are employed for operating single-phase alternating-current motors, the armature and field-magnet windings of which are in series relation.

The object of my invention is to provide a system of distribution and transformation which shall insure economy in the use of electrical energy by utilizing a single transmission-circuit for the operation of electrical vehicles upon two parallel tracks.

My invention is illustrated in the accompanying drawings, in which—

Figure 1 is a diagram of a three-phase transmission-circuit, a double-track railway, and transformers for supplying single-phase currents to the motors on the respective tracks. Fig. 2 is a diagram of a single-phase transmission-line, a double-track road, and a transformer constructed for supplying both tracks from said transmission-line. Fig. 3 is a diagram of a two-phase three-wire transmission system and double-track railway and means for supplying both lines from the two-phase circuit.

In Fig. 1 a three-phase generator 1 is shown as indicative of the power-house source of supply for the three-phase transmission-line 2, it being understood that such source may be either a single generator or a plurality of generators connected in parallel to the transmission-line and that it may also include step-up transformers in case a higher transmission electromotive force is desired than may be conveniently supplied directly by the generators. I propose to reduce the electromotive force of the transmission-circuit 2 for the purpose of supplying single-phase energy to each of two lines of double-track railway, as here shown.

The two trolley-conductors 3 and 4 are shown as overhead conductors; but they may obviously be located in slotted conduits or beneath the vehicles 5 and 6, but above the road-bed, and be either continuous or sectional conductors. The respective track-rails 7 and 8 of the two parallel lines of road are here shown as constituting the return-conductors of the work-circuit, this being a usual and convenient arrangement. Other means for completing the working circuit may, however, be employed, if desired. In order to supply each of the working circuits with a single-phase current for operating its motors, I employ two transformers 9 and 10, the primary windings 11 and 12 of which are connected to each other and to the three-phase circuit and are respectively proportioned as set forth in Patent No. 606,033, granted to me June 21, 1895. The secondary windings 13 and 14 of these two transformers have their respective outer terminals connected to the trolley-conductors 3 and 4 by means of conductors 15 and 16, and their inner terminals are connected together and to both of the return-conductors 7 and 8 by means of a conductor 17. It follows from this arrangement of apparatus that a saving of conductors for the transmission-circuit is effected by employing a three-phase system and that a further saving is effected by using the rails of the two roads as a common return for both circuits, thus reducing the current in each rail-return below that in each of the trolley-conductors.

In Fig. 2 the source of energy, which may be either one or a plurality of generators or one or more generators in conjunction with step-up transformers, is represented by a single-phase generator $1^a$, and the transmission-circuit $2^a$ is therefore a single-phase circuit. Energy at a lower potential may obviously be derived from the transmission-circuit for the translating devices represented as railway-vehicles 5 and 6, operating on two lines 3 7 and 4 8 on a double-track railway by means of separate step-down transformers; but, as illustrated, I supply energy to the two work-circuits by means of a single transformer 18, the outer terminals of the secondary 19 of which are respectively connected to the power-conductors 3 and 4 by conductors 20 and 21. An intermediate point in the secondary winding 19 is connected to both of the return-conductors 7 and 8 by means of a conductor 22. This arrangement may be made such as to provide for separate voltages for the two work-circuits, if desired, by connecting the conductor 22 to some other than the middle point of the winding 19.

In Fig. 3 the power-house source of energy is represented by a two-phase generator $1^b$, which, as has already been pointed out in connection with the other figures of the drawings, may represent such combinations of generators and transformers or generators alone as may be desired. As here shown, the two return-conductors 7 and 8 (here indicated as the track-rails) constitute the return-conductors for the generator $1^b$ as well as of the transformers which directly supply the work-circuit. The other portion, $2^b$, of the transmission-circuit is connected to the conductors 7 and 8 by transformer-windings 23 and 24. Intermediate points in the windings are connected to the respective conductors 3 and 4 by conductors 26 and 27.

With this system we have the advantages of a polyphase transmission-circuit and a saving in conductors by the use of the rails as return-circuits for both phases of the high-voltage circuits and also for the two trolley-circuits.

It is to be understood that as many transformers or sets of interconnected transformers are to be employed as may be necessary, the number depending upon the distance over which the energy is transmitted and utilized. It is to be also understood that the transformers may be of either the auto or two-coil type and that in each case the return-conductors may be independent of the track-rails, though, as already stated, it will be found in general more economical to utilize the track-rails as return-conductors.

I claim as my invention—

1. In a system of distribution for electric railways, the combination with a source of alternating currents and a transmission-circuit, of two parallel lines of track, two connected transformers for transferring energy from the transmission-circuit to the two work-circuits, said transformers having a single connection to two of the corresponding sides of the work-circuits.

2. In a system of distribution for electric railways, the combination with a source of alternating currents and a transmission-circuit, of two side-by-side work-circuits, two transformer-windings respectively connected to one side of each of the two work-circuits and having a common connection to the other side of each work-circuit.

3. In a system of distribution for electric railways, the combination with a source of alternating currents and a transmission-circuit, of two parallel railways, transformer connections between the transmission-circuit and said railways comprising two secondaries respectively connected to the supply-conductor of each railway and having a common connection to the rails of both railways.

4. In a system of distribution for electric railways, the combination with a source of polyphase alternating currents and a transmission-circuit, of a double-track railway and potential-reducing, interconnected transformers interposed between the transmission and railway circuits and supplying two single-phase currents through three wires.

5. In a system of distribution for electric railways, the combination with a polyphase transmission-circuit, of a double-track railway and potential-reducing, interconnected transformers interposed between the transmission and railway circuits and supplying two single-phase currents thereto.

6. In a system of distribution for electric railways, the combination with a source of alternating currents and a transmission-circuit, of two parallel railways, and transformer connections between the transmission-circuit and the railways, the transformer secondary end terminals being respectively connected to corresponding sides of the railway-circuits and having a common, intermediate connection to the other side of each railway-circuit.

In testimony whereof I have hereunto subscribed my name this 8th day of September, 1902.

CHARLES F. SCOTT.

Witnesses:
JAMES B. YOUNG,
WESLEY G. CARR.